United States Patent
Dooley

(10) Patent No.: US 7,119,461 B2
(45) Date of Patent: Oct. 10, 2006

(54) ENHANCED THERMAL CONDUCTIVITY FERRITE STATOR

(75) Inventor: Kevin Allan Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 269 days.

(21) Appl. No.: 10/395,195

(22) Filed: Mar. 25, 2003

(65) Prior Publication Data
US 2004/0189108 A1    Sep. 30, 2004

(51) Int. Cl.
H02K 1/00    (2006.01)
H02K 1/02    (2006.01)
H02K 1/12    (2006.01)
H02K 47/04   (2006.01)

(52) U.S. Cl. ............... 310/52; 310/259; 310/113; 310/216

(58) Field of Classification Search ........... 310/254, 310/258–259, 112–113, 209, 68 C, 46, 52, 310/66, 216–218, 191, 596
See application file for complete search history.

(56) References Cited

U.S. PATENT DOCUMENTS

| | | |
|---|---|---|
| 3,707,638 A | 12/1972 | Nailen |
| 3,812,441 A | 5/1974 | Sakamoto et al. |
| 3,961,211 A | 6/1976 | Vergues |
| 4,237,395 A | 12/1980 | Loudermilk |
| 4,250,128 A | 2/1981 | Meckling |
| 4,392,072 A | 7/1983 | Rosenberry |
| 4,401,906 A | 8/1983 | Isobe et al. |
| 4,445,061 A | 4/1984 | Jackson, Jr. |
| 4,547,713 A | 10/1985 | Langley et al. |
| 4,562,399 A | 12/1985 | Fisher |
| 4,605,874 A | 8/1986 | Whiteley |
| 4,638,201 A | 1/1987 | Feigel |

(Continued)

FOREIGN PATENT DOCUMENTS

DE    1671038    10/1971

(Continued)

OTHER PUBLICATIONS

Horgan, Michael; Temperature Effects On Transformer and Inductor Core Materials; Mar. 5-10, 2000; CARTS 2000: 20th Capacitor And Resistor Technolgy Symposium, pp. 122-128.*

(Continued)

Primary Examiner—Burton S. Mullins
Assistant Examiner—David W. Scheuermann
(74) Attorney, Agent, or Firm—Ogilvy Renault LLP

(57) ABSTRACT

A permanent magnet electric machine (i.e.: motor/generator) having a magnetic flux circuit including a stator and a permanent magnet rotor mounted for rotation about an axis relative to the stator. The stator has an electric circuit with windings electro-magnetically coupled to the magnetic circuit. The stator is of material having a Curie temperature, wherein magnetic flux circulation through the stator material is impeded when the stator material acquires a temperature above the Curie temperature. The stator includes heat conducting layers and magnetic flux conducting layers, where the thermal conductivity of the heat conducting layers is greater than the thermal conductivity of the magnetic flux conducting layers. By this means the overall thermal conductivity of the stacked stator assembly is improved and means for quickly effecting shutdown of the electric machine are provided with a heat exchanger thermally coupled to the stator, thereby regulating magnetic flux circulation through the stator material. Preferably the magnetic flux conducting layers are manganese zinc ferrite, and the heat conducting layers are: insulated copper sheets; insulated aluminum sheets; thermally conductive polymer sheets; sheet metal; or plated metal layers deposited on associated magnetic flux conducting layers.

17 Claims, 7 Drawing Sheets

U.S. PATENT DOCUMENTS

| | | | |
|---|---|---|---|
| 4,799,578 A | 1/1989 | Matsushita | |
| 4,896,756 A | 1/1990 | Matsushita | |
| 4,897,570 A | 1/1990 | Ishikawa et al. | |
| 4,924,125 A | 5/1990 | Clark | |
| 5,184,040 A | 2/1993 | Lim | |
| 5,235,231 A | 8/1993 | Hisey | |
| 5,245,238 A * | 9/1993 | Lynch et al. | 310/116 |
| 5,260,642 A * | 11/1993 | Huss | 322/51 |
| 5,397,948 A | 3/1995 | Zoerner et al. | |
| 5,555,722 A | 9/1996 | Mehr-Ayin et al. | |
| 5,585,682 A | 12/1996 | Konicek et al. | |
| 5,742,106 A | 4/1998 | Muraji | |
| 5,770,901 A | 6/1998 | Niimi et al. | |
| 5,822,150 A | 10/1998 | Kelsic | |
| 5,834,874 A | 11/1998 | Krueger et al. | |
| 5,838,080 A | 11/1998 | Couderchon et al. | |
| 5,907,202 A | 5/1999 | Muraji | |
| 5,917,248 A | 6/1999 | Seguchi et al. | |
| 6,100,620 A | 8/2000 | Radovsky | |
| 6,114,784 A | 9/2000 | Nakano | |
| 6,118,194 A * | 9/2000 | Kawamura | 310/75 R |
| 6,166,469 A * | 12/2000 | Osama et al. | 310/90.5 |
| 6,300,693 B1 * | 10/2001 | Poag et al. | 310/54 |
| 6,313,560 B1 | 11/2001 | Dooley | |
| 6,565,801 B1 * | 5/2003 | Froud et al. | 422/5 |
| 6,583,995 B1 | 6/2003 | Kalman et al. | |

FOREIGN PATENT DOCUMENTS

| | | |
|---|---|---|
| EP | 617264 | 9/1994 |
| EP | 836007 | 4/1998 |
| GB | 2007922 | 5/1979 |
| GB | 2130806 | 6/1984 |
| WO | WO 188351 A1 * | 11/2001 |
| WO | WO 03/028202 A1 | 4/2003 |

OTHER PUBLICATIONS

SAE Technical Paper Series 892252, Application Considerations for Integral Gas Turbine Electric Starter/Generator revisited. 1989.

* cited by examiner

ENHANCED THERMAL CONDUCTIVITY FERRITE STATOR

TECHNICAL FIELD

The invention relates to an electric motor/generator with thermally activated control with a stator having enhanced thermal conductivity.

BACKGROUND OF THE ART

Electric machines, motors and generators require some means to control the output current, speed of rotation, excess heat generation and accommodate failure modes, such as those due to short circuit conditions and the like.

For example the inventor's U.S. Pat. No. 6,313,560 relates to electric machines that are thermally protected from damage resulting from internal faults, such as high short circuit currents, using the Curie point properties of low Curie point materials, such as ferrite in constructing the machine. Heat generated by an internal fault, such as a short circuit, heats the material above its Curie point, i.e.: where magnetic flux circulation is impeded and the machine is shut down. Careful selection of a material having a Curie point below the maximum permissible operating temperature for the machine thus permits the low Curie point material to act as a sort of thermal fuse for the device.

Permanent magnet electric motors and generators usually include a rotor of magnetic material such as Samarium-Cobalt. In close proximity to the rotor, electric windings on a stator carry current that generates a magnetic field, in a motor, or that carry current induced by a rotating magnetic field generated by the rotor, in a generator.

As is well known, the motor/generator arrangement can be reversed such that an internal stator is housed inside an external rotor. It will be understood therefore that the present invention and description of prior art equally applies to both common electrical machine configurations with internal and external rotors.

In aircraft engine starter-generator applications, an electric machine (generally preferably connected directly to a main spool of the gas turbine) replaces a conventional auxiliary gearbox. Disadvantageously, however, electric machines coupled to aircraft turbine engines can potentially generate extreme power limited only by the power of the turbine engine driving the rotor of the machine. Unabated, generation of such electric power can result in extreme heat, particularly in the stator windings, that may cause the motor to melt and potentially burn. This is clearly undesirable, especially in aircraft.

Current provided by the machine to external electrical equipment may be limited by fusing arrangements, but such fusing arrangements provide no protection to the machine itself. The device described in the inventor's U.S. Pat. No. 6,313,560, thermally protects the motor/generator itself from damage resulting from internal faults.

When a low Curie point material, such as ferrite is incorporated into a machine, the time required for the ferrite in the low Curie point material in the machine to reach the Curie temperature during the internal fault event, is related to the ratio of thermal capacity to thermal conductivity and the temperature differences between the stator material and the surroundings. This has implications for response times, especially in larger machines. Accordingly, opportunities for improvements in design are available.

It is an object of the present invention to improve the reaction time of a low Curie point internal fault protection system.

Further objects of the invention will be apparent from review of the disclosure, drawings and description of the invention below.

DISCLOSURE OF THE INVENTION

The invention provides an electric machine (i.e.: motor/generator) having a magnetic flux circuit including a stator and a permanent magnet rotor mounted for rotation about an axis relative to the stator. The stator has an electric circuit with windings electro-magnetically coupled to the magnetic circuit. The stator is of material having a Curie temperature, wherein magnetic flux circulation through the stator material is impeded when the stator material acquires a temperature above the Curie temperature. Preferably to increase the speed of operation, the stator includes heat conducting layers and magnetic flux conducting layers, where the thermal conductivity of the heat conducting layers is greater than the thermal conductivity of the magnetic flux conducting layers. By this means the overall thermal conductivity of the stacked stator assembly is improved and means for quickly effecting shutdown of the electric machine are provided with a heat exchanger thermally coupled to the stator, thereby regulating magnetic flux circulation through the stator material. Preferably the magnetic flux conducting layers are manganese zinc ferrite, and the heat conducting layers are: insulated copper sheets; insulated aluminum sheets; thermally conductive polymer sheets; sheet metal; or plated metal layers deposited on associated magnetic flux conducting layers.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

Figure 1:
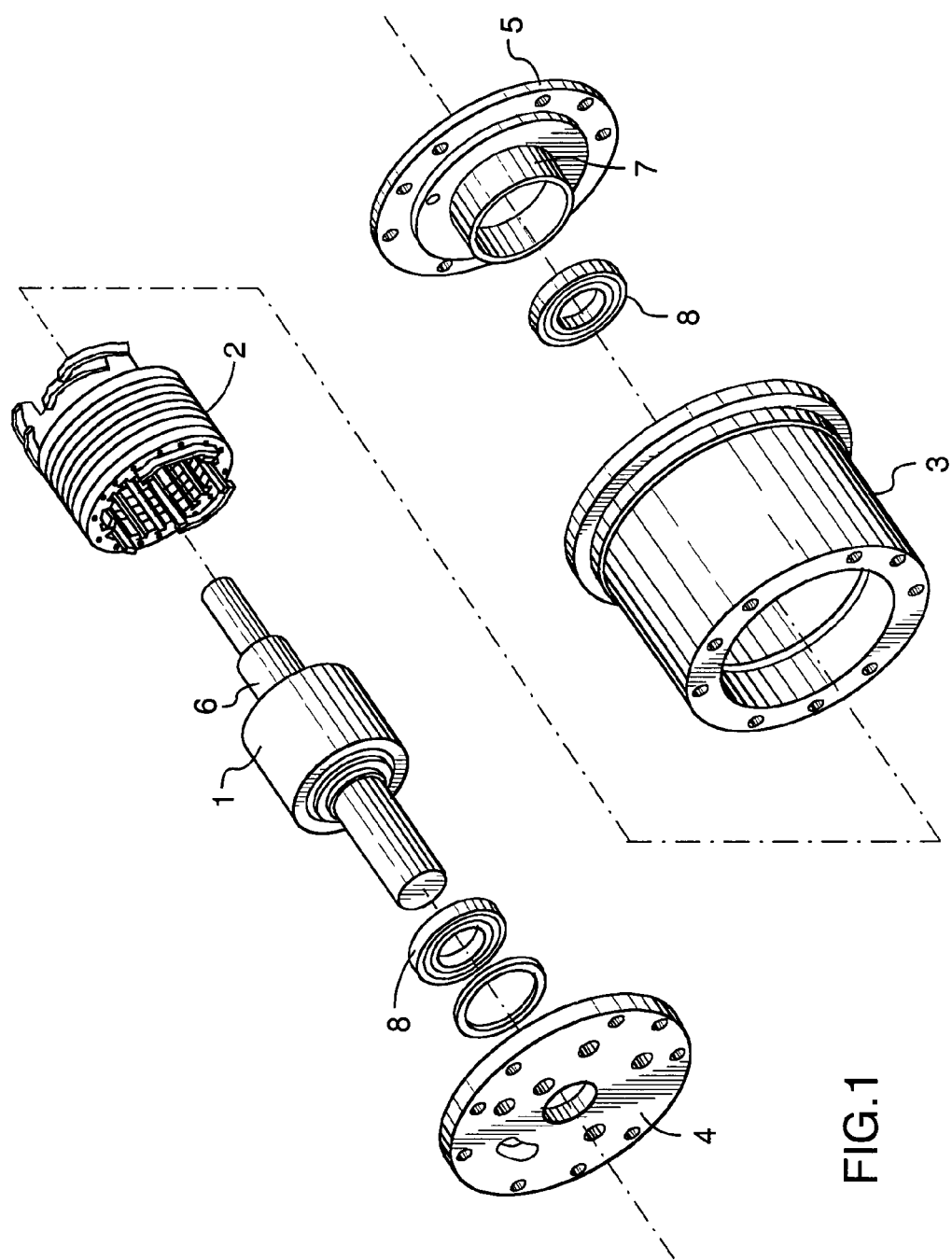
FIG. 1 is an exploded isometric view of an electric machine having a stator according to the present invention.
Figure 2:
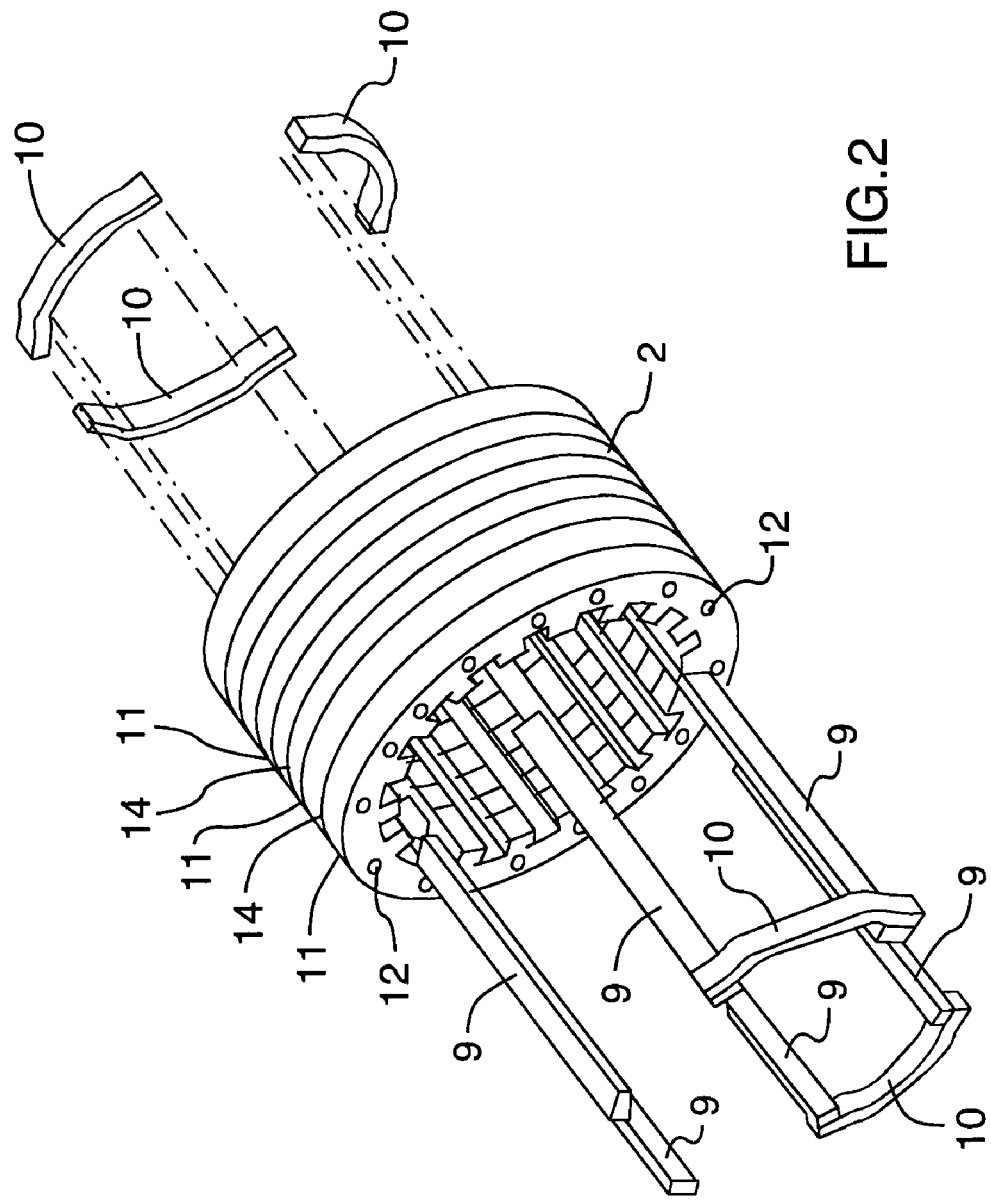
FIG. 2 is an enlarged exploded isometric view of the stator of FIG. 1 with portions removed to better show the configuration of the stator itself.
Figure 4:
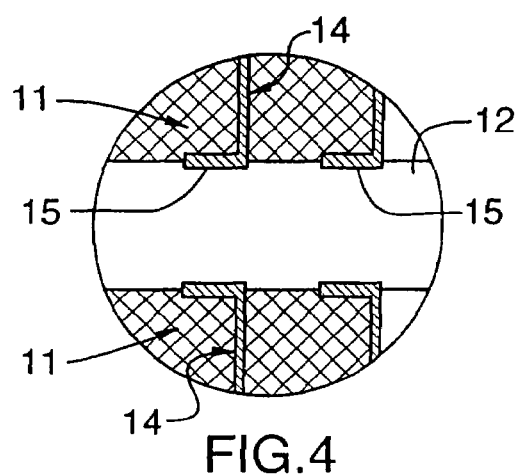
FIG. 4 is a detailed view axial cross-section view through the fluid flow bore showing the relatively thin heat conducting layers with flanges within the fluid flow bores interior surfaces to improve the overall thermal conductivity.
Figure 3:
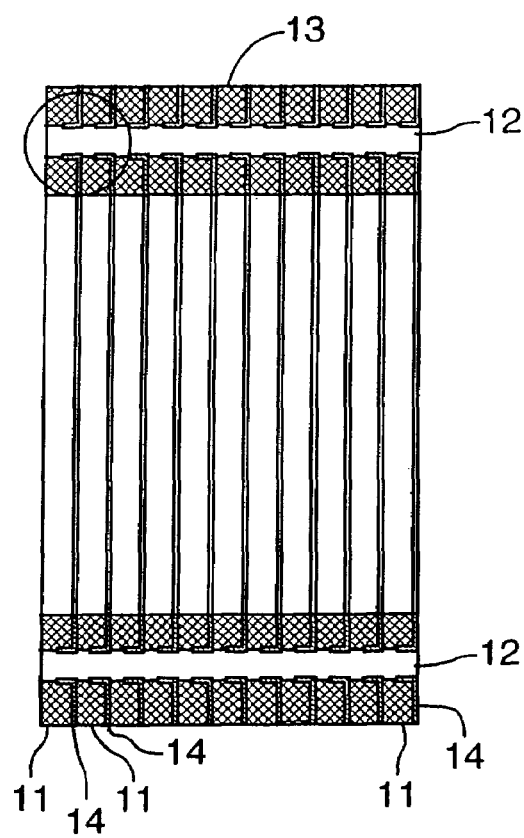
FIG. 3 is an axial cross-sectional view through the laminated stator core assembly showing axially extending fluid flow bores to define heat exchange modules thermally coupled to the layers of the stator core.

FIGS. 1 and 2 show a first embodiment of the invention applied to an electric machine having an internal rotor 1 and external stator 2. FIGS. 3 to 7 show a second embodiment of an electric machine configuration, according to the present invention, having an internal stator 22 and a surrounding annular external rotor 16. FIGS. 3 and 4 show the layered structure of the stator core 13 (with stator teeth 21 removed for clarity) with axially extending fluid flow bores 12 to perform a heat exchanger type function to assist in thermally coupling the machine components to the stator core 13.

As indicated with arrows in FIG. 5, and described in detail below, a heat exchanging fluid such as oil, circulates through the stator slots 23 immersing the windings 9 between stator teeth 21 and returning through the stator core 13 via bores 12. In addition to the heat conducting layers 14, the passage of fluid through the stator 22 thereby cools the windings 9 during normal operation and in the event of a heat generating internal fault, distributes heat more uniformly throughout the mass of the stator 22, to further improve the reaction time of the low Curie point internal fault protection system.

FIG. 1 shows a permanent magnet electric machine having a magnetic flux circuit including an internal rotor 1 surrounded by an external stator 2, both of which are mounted inside an annular housing 3 and enclosed within end plates 4 and 5. The internal rotor 1 is mounted on a central shaft 6, the end portions of which are rotatably mounted within annular bosses 7 in the end plates 4 and 5 on bearings 8.

As shown in FIG. 2, the external stator 2 has a layered structure which will be described in detail below. The stator 2 has an electric circuit comprising rectangular bar shaped windings 9 with end conductors 10 to complete a looped winding circuit. FIG. 2 illustrates one circuit loop. It will be understood that the other two winding circuits of a three phase machine have been omitted for clarity only. The stator 2 and the electric circuit windings 9 are electro-magnetically coupled to the magnetic flux circuit in a manner well known to those skilled in the art.

The stator 2 is constructed of magnetic flux conducting layers 11 of material of the type (for example, as described in U.S. Pat. No. 6,313,560) having a Curie temperature that is lower than a maximum permissible operating temperature at which thermal damage would be caused to the machine. Preferably the Curie point is between 90° C. and 300° C. for practical application in an electric machine. For example, depending on the machine design, the magnetic flux conducting layers 11 may be formed of manganese zinc ferrite which has a Curie temperature of approximately 200° C. (420° F.). The selection of material for a magnetic flux conducting layer 11 is described in more detail below. Stator 2 also includes a circumferential array of axially extending fluid flow bores 12 that are spaced about the stator 2 and in communication with a source of temperature control fluid, such as oil, provided by a heat exchanger 24. As will be described in more detail below and indicated with arrows in FIG. 5, the stator 2 can be thermally coupled and thereby the magnetic flux circulation through the stator material can be regulated, and heated oil conducted from the heat exchanger 24 through the fluid flow bores 12 and stator slots 23 can be used to heat the stator 2 to above its Curie temperature (but below the maximum permissible operating temperature) and thereby impede the flow of magnetic flow circulation between the stator 2 and the rotor 1.

In line with the teachings of the inventor's U.S. Pat. No. 6,313,560, incorporated herein by reference, a material is chosen for magnetic conducting layer 11 according to the following considerations. It will be well-understood that a machine designer is able, for a given machine design, to determine a temperature at which excessive heat will cause thermal damage to the machine (e.g. melting of components, degradation of insulation, degradation of lubricants, etc.). The designer is thus able to determine a desired temperature which is not to be exceeded during machine operation (the "specified maximum" temperature). Once the specified maximum temperatures is known, a magnetic material for magnetic conducting layer 11 may be selected which has a Curie point which is less than the specified maximum, and preferably sufficiently less than the specified maximum to provide a suitable safety margin. Selecting the magnetic material in this manner will ensure that, in the presence of an internal fault such as a short circuit, coolant loss or other fault causing the internal temperature of the machine (and particularly magnetic conducting layer 11) to rise to the Curie point of magnetic conducting layer 11, the portion of the magnetic circuit comprised by magnetic conducting layer 11 will begin to lose its magnetic its properties and thereby impede or prevent altogether (depending on the temperature experienced) a flow of magnetic flow through the magnetic circuit. By impeding or removing the magnetic properties of a portion of the magnetic circuit in the manner will cause the machine, when operated as a generator, to cease generating electrical energy (including heat) in the portion of the machine affected by the Curie turn-down described or, when operated as a motor, to cause the machine to lose speed, which may reduce the heat produced within the motor. The presence of conducting layer 14 assists in ensuring a more rapid heat transfer through and along magnetic conducting layer 11, thereby assisting an increased response time in the event the Curie temperature is reached locally within a portion of the device adjacent conducting layer 14. As described in U.S. Pat. No. 6,313,560, if the internal fault is such that the machine is permitted to cool down sufficiently during the period of time the described Curie turn-down mechanism is in effect, such that the operating temperature drops sufficiently below the Curie point of magnetic conducting layer 11, the machine may then begin normal operation by reason of the return of magnetic properties to magnetic conducting layer 11. Again, in this situation conducting layer 14 may be useful in communicating a temperature drop through and along magnetic conducting layer 11.

As shown in FIGS. 3 to 7, the invention is equally applicable to an internal stator 22 with stator core 13 within an external rotor 16. Stator core 13 has fluid flow bores 12 and an external series of stator slots 23 is defined by the array of T-shaped stator teeth 21 for accommodating the windings 9. FIG. 3 indicates that the stator 2 includes two types of laminated layers 11, 14. The heat conducting layer 14 is relatively thin compared to the magnetic flux conducting layer 11. The thermal conductivity of the heat conducting layer 14 is preferably greater than the thermal conductivity of the magnetic flux conducting layer 11 and therefore heat conducting layers 14 tend to increase the overall thermal conductivity of the external stator 2, and stator core 13 of internal stator 22. While use of laminated stators is widely known, the introduction by the present invention of heat conducting layers 14 significantly improves the net thermal conductivity particularly in association with fluid flowing between a heat exchanger 24 and fluid flow bores 12. The use of a laminated low Curie point stator 2, 22 has not been known prior to the present invention.

The heat conducting layers 14 may be selected from any number of materials such as electrically insulated copper sheets, electrically insulated aluminum sheets, thermally conductive electrically non-conductive polymer sheets, various sheet metals or metals that are plated in thin layers deposited on adjacent surfaces of associated magnetic flux conducting layers 11. It has been found that the heat conducting layers 14 may be as thin as 0.005 inches depending on the material. It will be understood that what is required is a heat conducting layer 14 which can affect the overall thermal conductivity of the entire stator assembly. For the metallic materials mentioned above, the preferred thickness range is between 0.005–0.050 inches thick.

Figure 5:
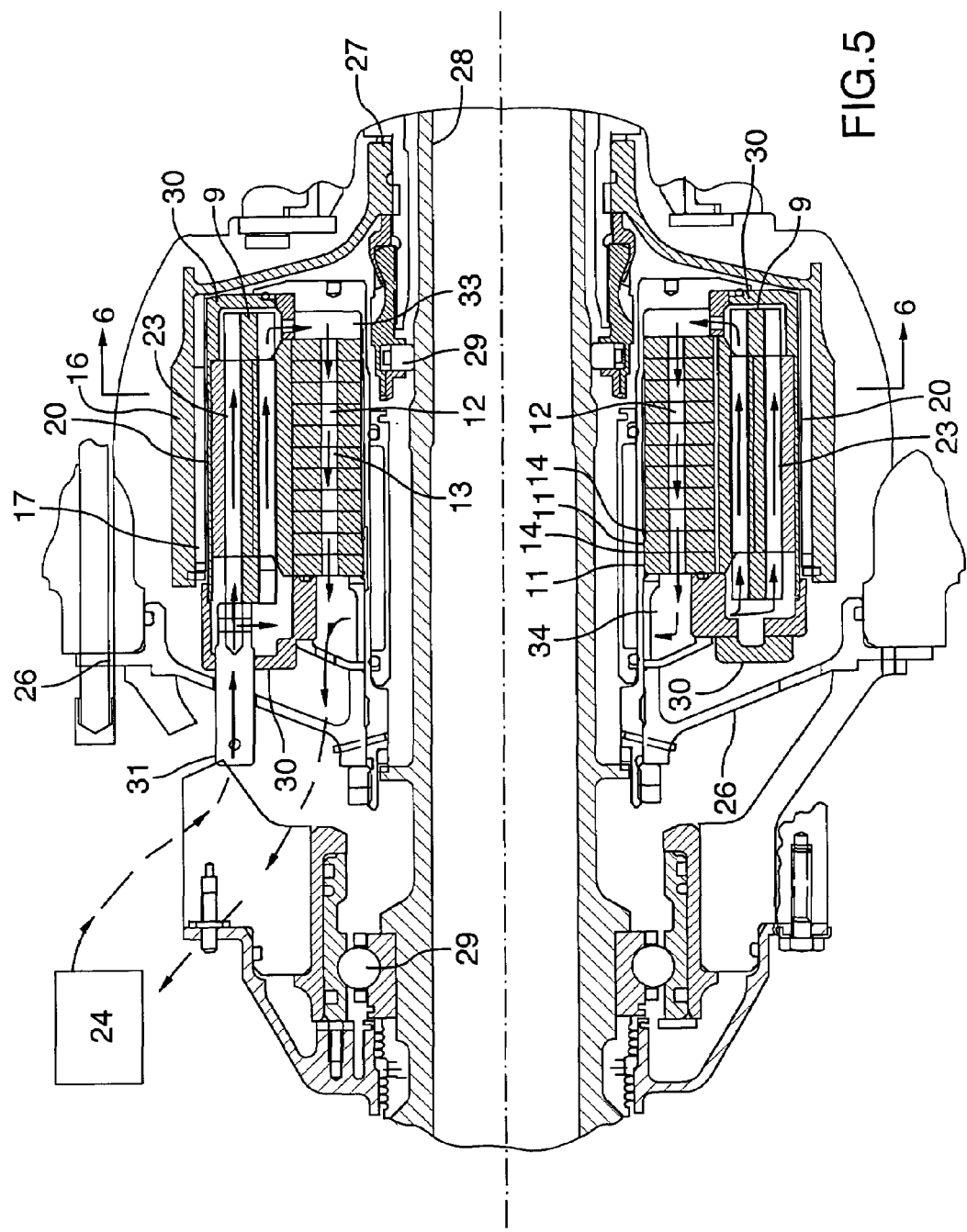
FIG. 5 is an axial cross-sectional view through an internal stator core with stator teeth and windings, with a surrounding external rotor, with arrows indicating the circulation of heat exchanging fluid through the stator.
Figure 8:
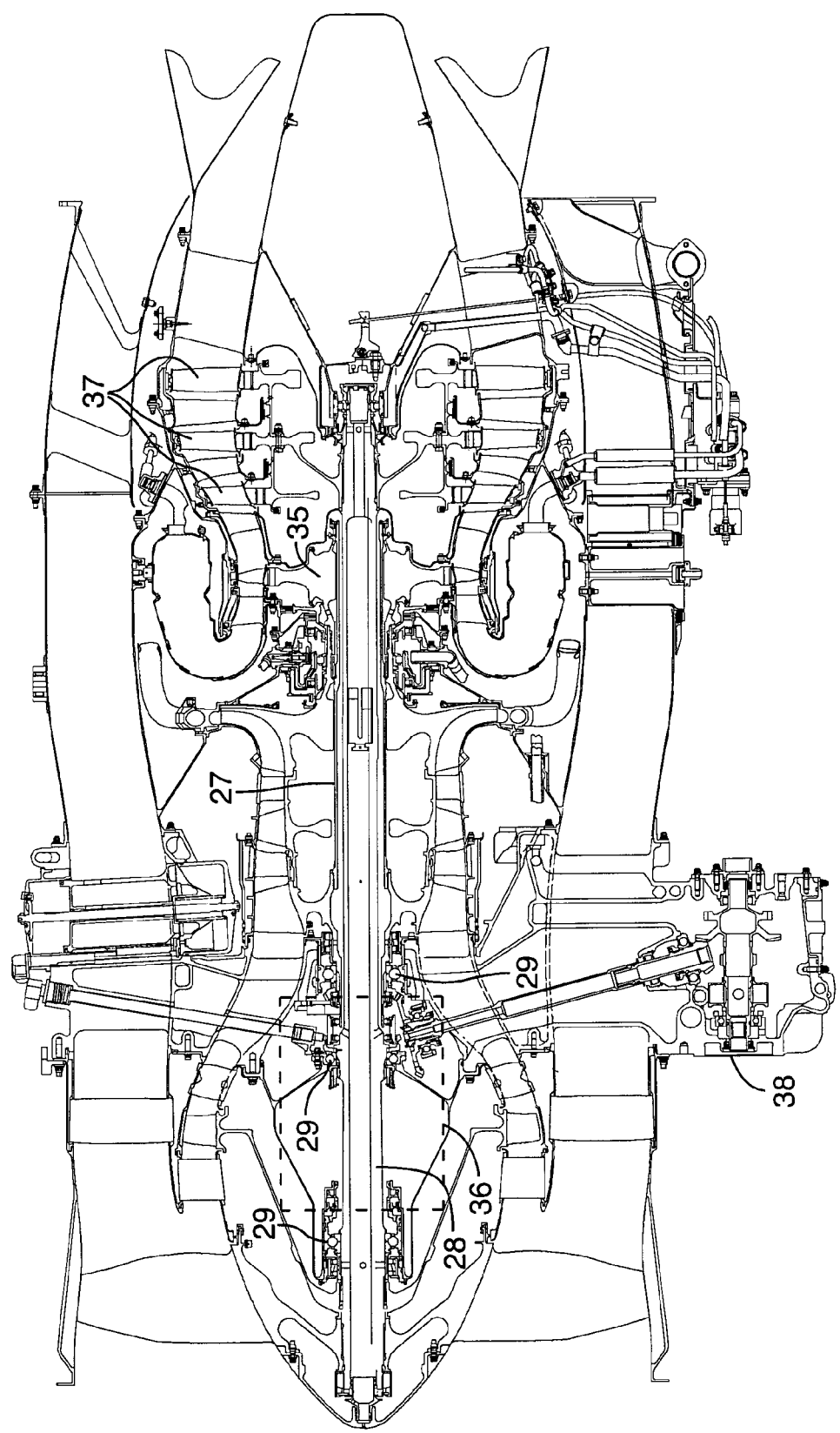
FIG. 8 is an axial cross-sectional view through a turbofan gas turbine engine showing the general location of components and a possible location for an integral motor/generator in dashed outline.

In operation then, with reference to FIG. 5, circuits comprising windings 9 may be driven by an appropriate power source, causing electric machine to act as a motor. More significantly, however, machine may be operated as a generator by driving turbine shaft 27 using a rotational source of mechanical power. For example, turbine shaft 27 may be interconnected with the high pressure turbine 35 of a gas turbine engine, as shown in FIG. 8, and driven at very high speeds (potentially in excess of 100,000 rpm). As will be appreciated, rotating rotor 16, and more particularly magnetic array of permanent magnets 17 will generate a rotating magnetic field about the central axis of rotor 16. This, in turn, establishes an alternating magnetic flux in the magnetic circuit defined by the stator 22. This flux, in turn, induces an electric current in the windings 9

Now, in the event machine is subject to an internal fault, such as for example, caused by a short across windings 9, current in the windings 9 will increase, resulting in increased heat in the windings 9. Moreover, as windings 9 are preferably in physical contact with, and thermally coupled to stator 22, increase in temperature of windings 22 will be transferred locally to the stator 22. The local temperature increase will then be transferred (generally by conduction and radiation) by conductive layers 14 through the stator 22, as well as through magnetic flux conducting layers 11. The skilled reader will appreciate that the additional amount of heat transferred though layers 14 will generally improve the rate at which heat is transferred from the windings 9 to the stator 22, and thus improve the response time of the low Curie point thermal protection scheme of the stator 22. Thus, as the temperature of stator 22 approaches the Curie temperature of the material forming the stator 22, the stator 22 loses its magnetic properties, thereby limiting the flux through stator 22 and the current induced in the windings 9 formed by the winding circuits, and effectively shutting down machine acting as a generator. Likewise, as the current is reduced in the windings 9, the temperature of the winding 9 is reduced until the temperature of stator 22 again drops below the Curie temperature of the material and its magnetic properties return. The heat conducting layers 14 again assist in better communicating the temperature change throughout the stator 22 structure. As will be apparent, in steady state and in the presence of a fault, the machine will operate with the stator 22 at or near the selected shut-down or Curie temperature, and thus the invention is beneficial in limiting the operating temperature of the machine, and thereby any damage to its components.

As indicated in FIGS. 2 to 7, and described herein, a plurality of heat exchange modules preferably extend through the stator (2, 22 and stator core 13), such as fluid flow bores 12, for circulation of a heat transfer fluid preferably oil, for example supplied by a heat exchanger 24. However, other fluids such as air or other suitable fluids may be utilized depending on the application. As shown in FIGS. 3 to 7, the fluid flow bores 12 extend transversely through the heat conducting layers 14 and, in order to increase the surface area exposed to the fluid passing through the fluid flow bores 12, the heat conducting layers 14 may include flanges 15 that extend into the interior of the fluid flow bores 12, and preferably at least partially line bores 12. Therefore, as shown in FIG. 4, the stator 2, 22 comprises a stacked array of annular heat conducting layers 14 and annular magnetic flux conducting layers 11 that are thermally coupled to conduct heat from fluid flowing through bores 12. This is done preferably in order to increase the thermal conductivity of the stator 2, 22, to thereby regulate the temperature of the stator 2, 22 and to regulate the electro-magnetic coupling between the magnetic flux circulation through the low Curie point stator material and the electric current in the windings 9.

Figure 6:
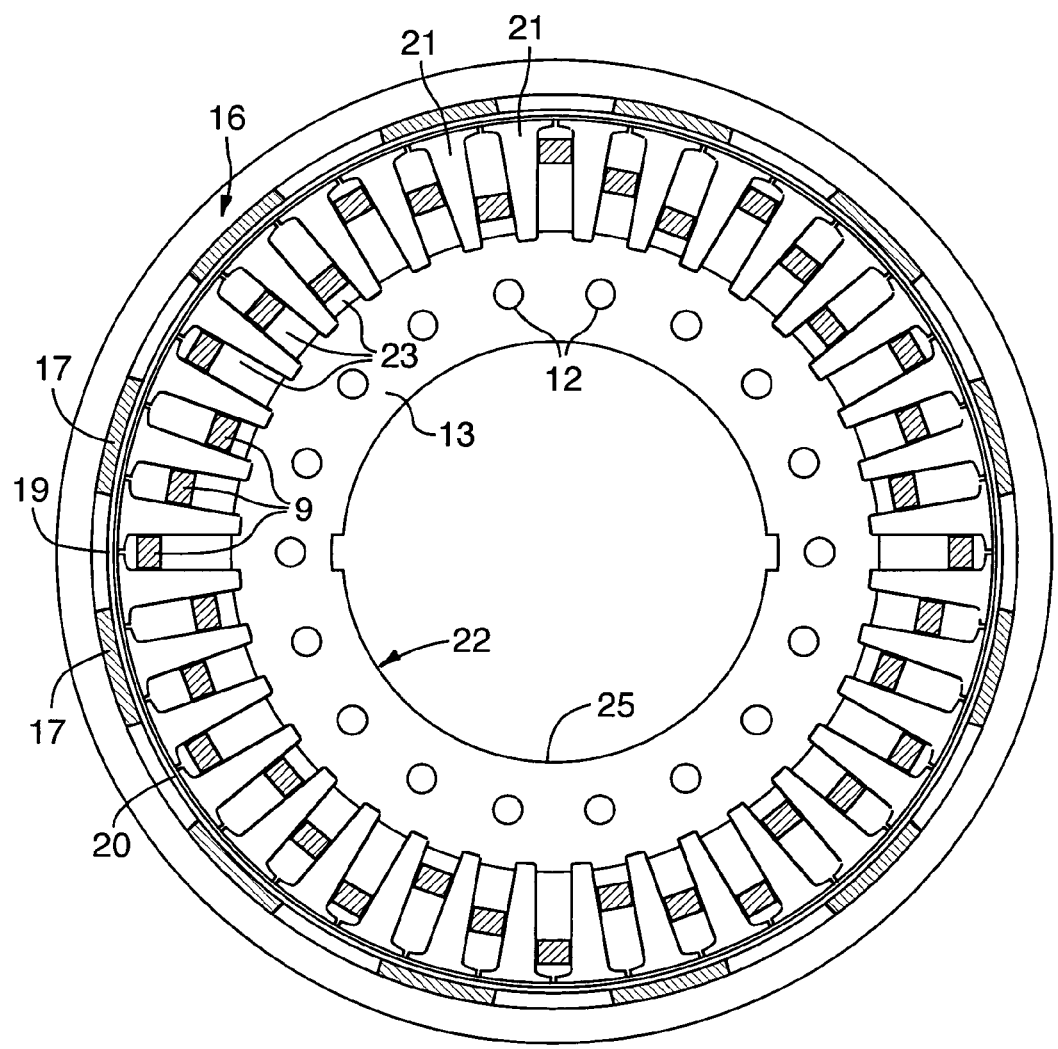
FIG. 6 is a radial sectional view along line 6—6 of FIG. 5.
Figure 7:
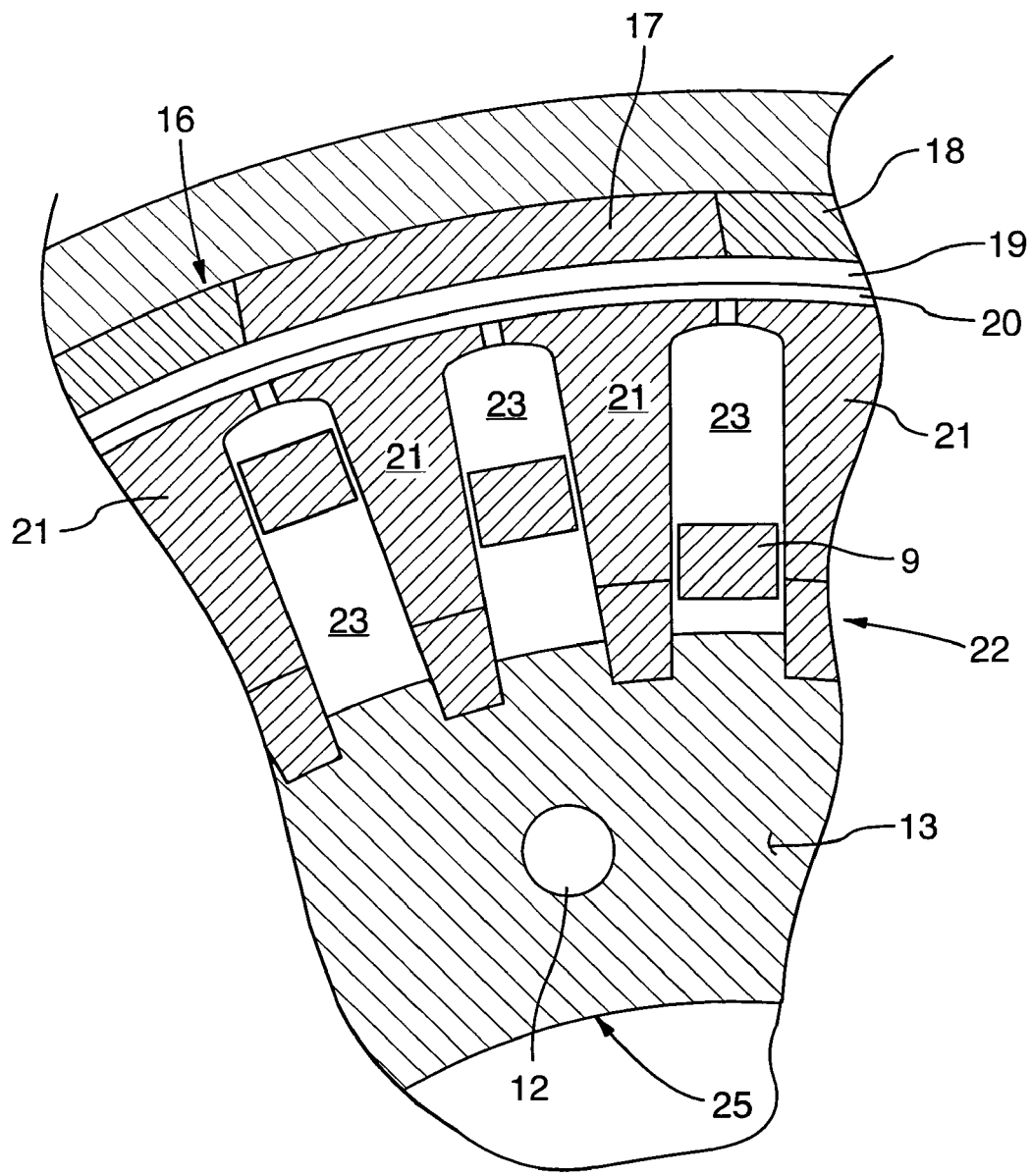
FIG. 7 is a detail view of a segment of the stator shown in FIG. 6.

FIGS. 5–7 in particular show the details of a preferred internal stator 22 thermally coupled to a heat exchanger 24 via circulating fluid, such as oil, as indicated with arrows. The internal stator 22 has a stator core 13 with a central opening 25 (see FIGS. 6, 7) for mounting on a stationary housing 26 (see FIG. 5). The external rotor 16 is mounted to an external turbine shaft 27. In the embodiment shown in FIG. 5, external turbine shaft 27 has an internal coaxial fan shaft 28 passing through it and mounted on bearings 29 as applied to a gas turbine engine for example. The external rotor 16 includes permanent magnets 17 with alternating yoke members 18 to secure the magnets 17 spaced about the interior surface. An annular air gap 19 separates the interior surface of the magnets 17 and yokes 18 of the rotor 16 from the exterior cylindrical surface of the vespel case 20 surrounding the internal stator 22.

The internal stator 22 is assembled from a laminated stator core 13, as described above with alternating layers 11, 14. The stator core 13 has a circumferential array of T-shaped stator teeth 21 that define stator slots 23 in which the three phase windings 9 are housed. A generally cylindrical vespel case 20 with annular vespel case end plates 30 surrounds the exterior of the stator 22 to contain the flow of oil that is passed through the stator slots 23 immersing the windings 9 and proceeds to return through the fluid flow bores 12, as described in detail below.

FIG. 5 shows the flow of fluid commencing at the heat exchanger 24, passing through the stationary housing 26 via an inlet conduit 31, through the vespel case end plate 30. As indicated with arrows, the vespel case end plate 30 defines a first annular passage 32 that forms a manifold to distribute fluid to the circumferentially spaced apart stator slots 23. As indicated with arrows, the oil proceeds axially (to the right) within the stator slots 23 immersing the windings 9 and exits the stator slots 23 radially inwardly through ports between the stator slots 23 and a second annular passage 33. The oil proceeds axially (to the left) through the fluid flow bores 12 exiting into a third annular passage 34. Oil is scavenged from the third annular passage 34 and returns to the heat exchanger 24. It will be understood that the heat exchanger 24 may be used to cool the stator 22, however in accordance with the invention the heat exchanger can be controlled to heat the stator 22 with the flow of oil as already described above. Further the term "heat exchanger" includes a heater, a chiller, a heat pump and other fluid heat control means. The description herein relates to use of fluid flow to control the temperature of the stator 22, however it will be understood that other means such as an embedded electric resistance heater within the stator 22 may be used to like advantage.

FIG. 8 is an axial cross-sectional view through a turbofan gas turbine engine showing the general location of components including the external turbine shaft 27 and the internal fan shaft 28. A high pressure turbine 35 drives the turbine shaft 27, while low pressure turbines 37 drive the fan shaft 28. A possible location for an integral motor/generator in accordance with the invention is shown in dashed outline. Conventionally a motor/generator for a gas turbine engine is mounted externally on the auxiliary gearbox 38.

The invention is also applicable to: rotors with low Curie point ferrite structures as well as the stators described herein; non-rotary electric machines; electromagnetic machines that do not include permanent magnets; any type of winding configuration; any number of windings or phases; a portion of a stator or rotor; and may include one or more laminations in each of the layers.

Although the above description relates to a specific preferred embodiments as presently contemplated by the inventor, it will be understood that the invention in its broad aspect includes mechanical and functional equivalents of the elements described herein.

I claim:

1. An electric machine having:
   a magnetic flux circuit including a stationary portion and a motive portion mounted for movement relative to the stationary portion, at least one of the stationary portion and the motive portion comprising a member having an electric circuit comprising at least one winding electromagnetically coupled to the magnetic circuit, the member being of material having a Curie temperature below a maximum permissible operating temperature at which the machine would be damaged, the member including heat conducting layers and magnetic flux conducting layers, and the thermal conductivity of the heat conducting layers being greater than the thermal conductivity of the magnetic flux conducting layers.

2. An electric machine according to claim 1 wherein the magnetic flux conducting layers comprise ferrite.

3. An electric machine according to claim 2 wherein the magnetic flux conducting layers comprise manganese zinc ferrite.

4. An electric machine according to claim 1 wherein the heat conducting layers are selected from the group consisting of: insulated copper sheets; insulated aluminum sheets; thermally conductive polymer sheets; sheet metal; and plated metal layers deposited on an associated magnetic flux conducting layer.

5. An electric machine according to claim 4, wherein the heat conducting layers have a thickness of 0.0005–0.050 inches.

6. An electric machine according to claim 1 wherein the machine further comprises a heat exchanger having a plurality of heat exchange bores extending through the member, the bores in communication with a source of temperature controlled fluid.

7. An electric machine according to claim 6, wherein the member includes heat conducting layers and magnetic flux conducting layers, and the thermal conductivity of the heat conducting layers is greater than the thermal conductivity of the magnetic flux conducting layers, and wherein the heat conducting layers are thermally coupled to the heat exchange bores.

8. An electric machine according to claim 7, wherein the bores extend transversely through the heat conducting layers.

9. An electric machine according to claim 7, wherein the heat conducting layers each include flanges within the bores.

10. An electric machine according to claim 9, wherein the flanges line an interior surface of the bores.

11. An electric machine according to claim 1, wherein the member comprises a stator, an axially stacked array of annular heat conducting layers and annular magnetic flux conducting layers.

12. A machine operable as an electric generator, the machine comprising a magnetic flux circuit including a stator and a rotor, the rotor mounted for rotation relative to the stator, the rotor including a plurality of permanent magnets, the stator having a plurality of windings coupled to the magnetic circuit, a portion of the magnetic flux circuit defined in the stator including a magnetic flux conducting material having a Curie temperature below a maximum desired operating temperature for the machine, the stator having a heat conducting apparatus contacting the magnetic flux conducting material, the thermal conductivity of the heat conducting apparatus being greater than the thermal conductivity of the magnetic flux conducting material.

13. A machine according to claim 12 wherein the magnetic flux conducting material comprises ferrite.

14. A machine according to claim 13 wherein the magnetic flux conducting material comprises manganese zinc ferrite.

15. A machine according to claim 12 wherein the heat conducting apparatus comprises heat conducting layers disposed in the magnetic flux material, the heat conducting layers selected from the group consisting of: insulated copper sheets; insulated aluminum sheets; thermally conductive polymer sheets; sheet metal; and plated metal layers deposited on an associated magnetic flux conducting layer.

16. A machine according to claim 15, wherein the heat conducting layers have a thickness of 0.0005–0.050 inches.

17. A machine according to claim 12 wherein the machine further comprises a heat exchanger having a plurality of heat exchange bores, the bores in communication with a source of temperature controlled fluid.

* * * * *